United States Patent [19]

Nohren, Jr.

[11] Patent Number: 5,674,391

[45] Date of Patent: Oct. 7, 1997

[54] LIQUID PURIFICATION LOW DENSITY PACKING ESPECIALLY FOR FIBERBOARD CONTAINERS

[75] Inventor: John E. Nohren, Jr., Clearwater, Fla.

[73] Assignee: Innova Pure Water Inc., Clearwater, Fla.

[21] Appl. No.: 358,163

[22] Filed: Dec. 16, 1994

[51] Int. Cl.$^6$ ........................................... C02F 9/00
[52] U.S. Cl. ..................... 210/266; 210/282; 210/286; 210/288; 210/493.1; 210/502.1
[58] Field of Search ........................... 210/266, 282, 210/484, 493.1, 501, 502.1, 504, 510.1, 283, 284, 286, 288, 290; 229/213, 214, 125.15

[56] References Cited

U.S. PATENT DOCUMENTS

| | | |
|---|---|---|
| 3,327,859 | 6/1967 | Pall ............................................ 210/282 |
| 4,964,562 | 10/1990 | Gordon ................................. 229/125.15 |
| 4,979,654 | 12/1990 | Nohren ..................................... 222/482 |
| 5,443,735 | 8/1995 | Kirnbauer et al. ....................... 210/504 |

FOREIGN PATENT DOCUMENTS 402661   12/1990   European Pat. Off. .

Primary Examiner—Ivars Cintins
Attorney, Agent, or Firm—Nixon & Vanderhye P.C.

[57] ABSTRACT

A container includes a gable top fiberboard or cardboard carton having a top and a bottom, and may be substantially filled with drinking water. An activated carbon-containing integral mass of material (e.g. which may be present in various forms and quantities to suit the intended purpose, such as in accordion pleated sheet form, floating at or near the surface of the water, in a porous containing element, etc.) is disposed within the carton and is capable of removing more than 90% of the chlorine, lead or other taste and odor contaminants from the water in its optimized configuration. The carton top typically has a pour opening and the carbon containing mass may be fixed so that the water only comes into significant contact with the mass when the water is being (or about to be) poured through the opening. A biocidal media may also be disposed in the carton positively separated from the carbon containing mass by separator plates and/or ion exchange media. A fill port may also be provided on the carton top with a fill tube extending from the fill port to just above the bottom of the carton. Both the fill and pour openings may be capped by readily removable and replaceable caps. When the carbon containing material is a low density web it most desirably has a surface area of between about 1.25–2.75 square feet per half gallon capacity of the carton. In a tube configuration the carbon is about 5–60% resin and about 95–30% granular or powdered carbon.

22 Claims, 6 Drawing Sheets

5,674,391

LIQUID PURIFICATION LOW DENSITY PACKING ESPECIALLY FOR FIBERBOARD CONTAINERS

BACKGROUND AND SUMMARY OF THE INVENTION

The use of "paper" (i.e. cardboard or fiberboard) cartons for milk and juices has become widespread. The cartons are typically folded from flat paper stock upon which one to three layers of polymer coatings have been applied to both sides. Milk cartons which typically have a useful life of less than 30 days are lap seamed which exposes the inside untreated edge of the carton to the contained fluid.

The paper from which the conventional cartons are made will leach a myriad of various chemicals used in its manufacturing process from the exposed uncoated edge over time so a skived edge is used with products whose shelf and use life may exceed about 30 days. Juice cartons are fabricated with a skived edge materially reducing or eliminating the exposed uncoated edge of the paper even though skived edged containers are more expensive and frequently use a heavier paper stock. Cardboard milk and juice cartons can impart a number of foreign tastes which occur from the leaching of the chemicals within the "paper". The bonding process of the paper partially solubilizes the plastic coatings releasing unwanted taste elements; the inks used to print upon the carton may transfer through the polymer layers and paper to the contained fluid also imparting unwanted tastes.

It is desirable from a cost, convenience, and equipment utilization standpoint to be able to supply drinking water in the same type of containers that now contain milk or juice. However, as water does not mask the foreign taste imparted by leaching of chemicals from the "paper", this problem is greatly magnified and has heretofore precluded the use of cardboard cartons for the transport and marketing of drinking water.

As activated carbon is highly effective at the removal of tastes and odors its use in a cardboard water carton can remove tastes imparted by the carton. However granular activated carbon is the only readily available product and is impractical for this application for several reasons including cost, need to contain, and contaminating fines. Standard carbon block technology requires a pressure source and is not adaptable. This invention provides the convenience and low cost of the cardboard carton to the "bottled" water consumer as well as opening a new market for water in cardboard cartons for companies now distributing milk and juices. It also permits the introduction of a high performance water filtration product with high utility and low relative cost to the consumer.

The invention also permits companies in the bottled water industry, or those considering entry therein, a means to replace expensive environmentally hostile plastic bottles with inexpensive environmentally safe cardboard containers. This invention brings forth several methods by which activated carbon can be incorporated at low cost into standard cardboard milk or juice cartons providing the mechanism by which the unwanted taste components as well as contaminants are removed from water which may have been present in the water at time of filling or which are imparted during carton sealing or storage prior to purchase and use; or as a simple highly effective water filter. One of the suggested uses permits the retention of chlorine, or other disinfectant, in the water precluding the growth of bacteria during storage, after filling, and prior to use. The growth of bacteria in bottled water is a recognized problem overcome by the subject invention in "single use" configurations as the disinfecting chemical is only removed as the water is poured from the cardboard board container. The subject invention may also be applied to plastic and glass "bottled" water containers permitting disinfectants to be left in the water to overcome the biological contamination problem inherent with "bottled" water. While the cartons may be refilled by the user, this is not the design criteria of two of the three applications of the subject technology.

Two of the treatment materials which may be used are low density non-woven mat, or open cell foams, to which activated carbon in granular or powder form is bonded either singularly or in combination with ion exchange resins and/or zeolyte formations. These materials may use medias having exceptional high exposed activated surfaces providing sufficiently high kinetics to remove the taste altering contaminants, including chlorine, within a desired time period. Another material is a porous extruded or die molded plastic bonded activated carbon component, which while not configuration limited, may obviously be employed in sheet form in much the same manner as the low density materials. This last material may also be modified with the addition of metals and/or zeolytes. The plastic bonded activated carbon is preferably formed into a molded or extruded cylinder with one closed end. The open end is attached to the pour spout, preferably on the interior, filtering on pouring. Typically, the closed end extruded or die molded activated carbon cylinder would have a porosity of 10–120 microns; be produced using about 5%–60% binder consisting of 75–135 mesh plastic resin granules, employ powdered or granular activated carbon (about 95–30%) of 80–325 mesh which in turn are bonded under heat and pressure or in a vacuum atmosphere with heat sufficient to permit the resins to become sufficiently fluid to effect the bond desired.

According to one aspect of the present invention a container is provided comprising: A gable top fiberboard or cardboard carton having a top and bottom (and typically substantially filled with water). And an activated carbon-containing integral mass of material, capable of removing more than 90% of the chlorine, lead or other taste and odor contaminants from the water disposed within, or introduced into, the carton.

The top of the carton may be permanently sealed as is the present custom, or sealed mechanically with a flap and clip or Velcro type material permitting the replacement of the filter assembly.

The carton top may have a pour opening (at least one), and the activated carbon containing mass may be fixedly mounted in the carton so that the water in the carton substantially only comes into significant content with the mass when water is being, or about to be, poured through the pour opening. The mass of material may be in sheet form, such as shown in published European patent 0402661 (the disclosure of which is hereby incorporated by reference herein) adjacent the bottom thereof, or the mass of material may float at or near the surface of the water in the carton.

Biocidal media may also be mounted within the carton and positively separated from the activated carbon containing media. For example the biocidal media and carbon containing media may be separated by an ion exchange media and/or porous media separator plates.

In addition to the pour opening on the top of carton a fill port may be provided at the top and a fill tube extending from the fill port to just above the bottom of the carton. The fill tube may extend into the biocidal media which either may be side by side with the carbon containing media, or below the carbon containing media, supported by the bottom of the carton.

The mass may include a containing element of material capable of being heat bonded to the fiberboard or cardboard carton, and a heat bond may be provided between the containing element and the carton holding, the mass in place in the carton. When the carbon containing mass is in sheet form it may be in an accordion pleated sheet having a low density configuration. Such accordion pleated sheet may be retained within a porous outer shell or container to facilitate handling and automatic assembly as well as to contain carbon fines. Alternatively it may comprise a hollow tube surrounding the pour opening and extending into the carton from the pour opening. Both the fill and pour openings in the top may be capped by readily removable and replaceable caps, or one of them can be the conventional openable pour spout provided in standard cardboard milk cartons.

According to another aspect of the present invention a container is provided comprising: A gable top fiberboard or cardboard carton having a top and a bottom and having a low density web of activated carbon-containing material disposed within the carton, the web having a surface area of between about 1.25-2.75 sq. feet per half gallon capacity of the carton. Separate and distinct fill and pour openings may be provided in the top of the carton.

According to another aspect of the present invention a container may be provided comprising: A gable top fiberboard or cardboard carton having a top and a bottom. An activated carbon-containing integral media. A biocide-containing media (both the carbon and biocide-containing media mounted within the carton). And, separating means disposed within the carton separating the carbon-containing media from the biocide-containing media. The container may further comprise first and second openings disposed in the carton top, the first opening in direct communication only with the carbon-containing media and the second opening in direct communication only with the biocide-containing media. The carbon containing and biocide containing media may be mounted side by side in the carton with the separating means comprising at least one of a porous media separator plate, an ion exchange media.

The invention also comprises a top portion with a pour opening therein, and extending inwardly into the container from the pour opening a filter tube, the filter tube comprising about 5-60% binder of 75-135 mesh plastic resin granules, and about 95-30% powdered or granular activated carbon of about 80-325 mesh, bonded together, and having a porosity of 10-120 microns.

It is the primary object of the present invention to provide for the effective utilization of cardboard or fiberboard cartons commonly used to package juice and milk for packaging drinking water, while overcoming the problems recognized in the art heretofore for the use of such cartons for drinking water. This and other objects of the invention will become clear from an inspection of the detailed description of the invention and from the appended claims.

DETAILED DESCRIPTION OF THE DRAWINGS

Figure 1:
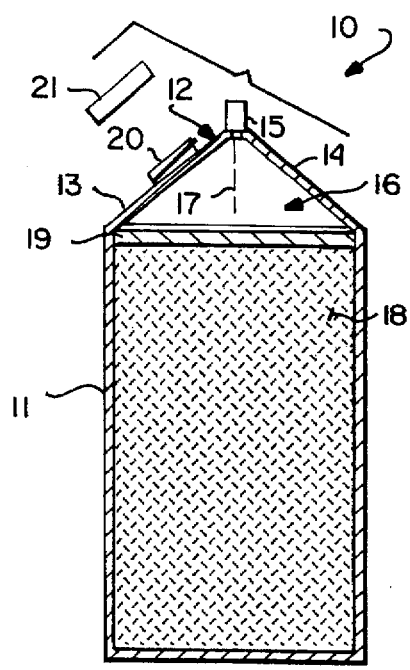
FIG. 1 is an end view of an exemplary carton according to the present invention with the near end wall of the body of the carton removed to illustrate the low density media therein.

FIG. 1 illustrates a container 10 according to the present invention. The container 10 comprises a cardboard or fiberboard (the terms "cardboard" and "fiberboard" as used in the present specification and claims meaning all types of paper cartons such as conventionally used for packaging of milk and juices, which may be coated or uncoated, with conventional or skived edges) carton 11 which has a conventional gable top 12. The conventional gable top 12 includes the angled portions 13, 14 forming the sides of the carton top 12, and attached together at a top ridge 15. As is commonly provided in milk cartons particularly, a pour spout may be formed in one end thereof, illustrated schematically by reference numeral 16 in FIG. 1, by separating end flaps of the sides 13, 14 at the ridge 15 and moving them outwardly at the container so that the line 17 becomes the outer edge of the pour spout.

What has been hereto described is conventional, but what is new according to the present invention is the provision of drinking water in the carton body 11, as well as an activated carbon containing integral mass of material—shown generally at 18 in the exemplary embodiment illustrated in FIG. 1—capable of removing more than 90% of the chlorine or other taste and odor undesirable components from the water within the carton 11. In the embodiment illustrated in FIG. 1 the activated carbon-containing integral mass 18 comprises a low density activated carbon material having a void volume of about 60–90%, which may be a non-woven cloth or a foam, and such as described in published European patent application 0402661 (the disclosure of which is hereby incorporated by reference herein). Also it is preferred that a particle filter of any fine pore material (e.g. a perforated plastic sheet) 19 be provided just below the gable top 12 and just above the mass 18 to remove any particles before they are poured out of the container 10. Similarly, the mass 18 may be totally encapsulated in a bag or porous housing for retention of fines and assembly of the filter to the outer housing. Also, as is known per se for conventional juice containers, a pour opening 20 is preferably provided in the gable top 12 (i.e. the side panel 13 as illustrated in FIG. 1), the opening 20 preferably capped by a readily removable and replaceable (e.g. snap fit or screw on) plastic cap 21.

Figure 2:
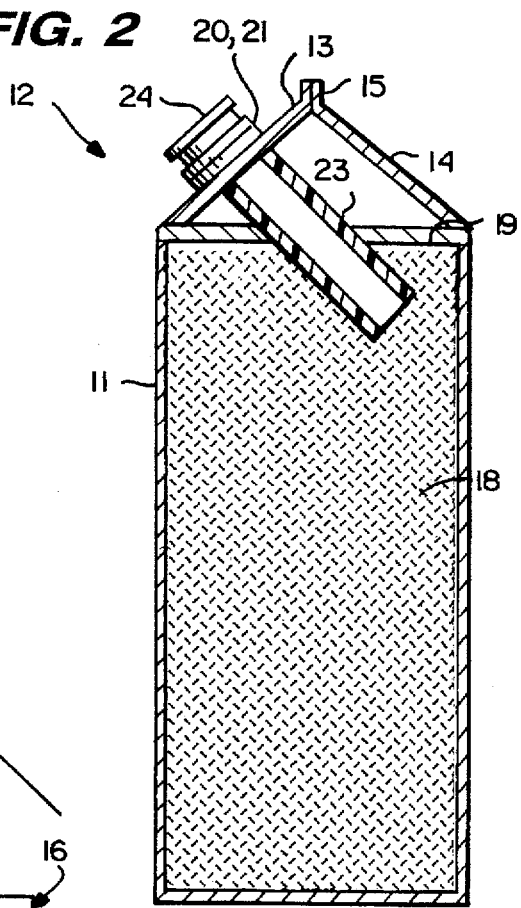
FIG. 2 is an end cross-sectional view of another embodiment of a carton according to the present invention.

FIG. 2 shows an embodiment similar to that of FIG. 1 only having an additional component (with comparable components having the same reference numbers). In this case instead of just the capped pour opening 20, 21 in the surface 13 of the gable top 12, a fill tube 23, having an open top capped by a plastic cap 24, is also provided, the fill tube 23 extending into the mass 18 as illustrated in FIG. 2.

Figure 3:
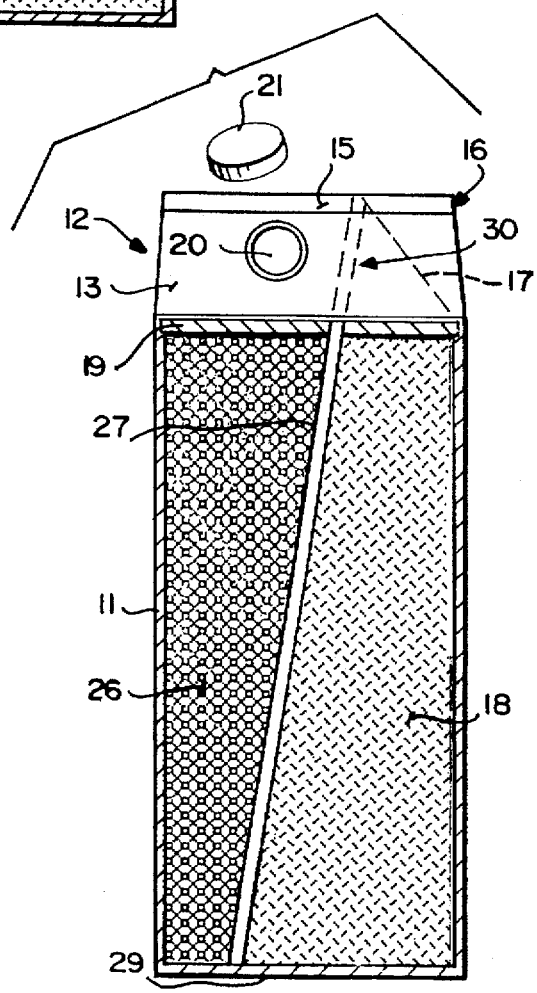
FIG. 3 is a side view of the carton of FIG. 1 with the near side wall removed for clarity of illustration of the interior thereof.

FIG. 3 is a side cross-sectional view of another slight modification of the embodiment of FIG. 1 (again common components are shown by the same reference numerals). In the case of the FIG. 3 embodiment instead of merely the carbon containing low density media 18 being provided another media—a biocide media—is also provided, in this case in the form of an ion exchange biocidal media illustrated generally by reference numeral 26. A partially porous media separator plate 27 is shown dividing the interior of the carton 11 so that the biocidal media 26 is on one side thereof and activated carbon containing media 18 on the opposite side. In this embodiment typically the opening 20 is merely used for filling of the container, while the pour spout formed in the openable end 16 (and communicating with the activated carbon mass 18) is what the water is poured through when exiting the carton 11. The separator plate 27 typically abuts the bottom 29 of the carton 11, and also makes a tight frictional engagement with the side walls of the carton 11, and has a triangular configuration where illustrated at dotted line, generally by reference numeral 30, in FIG. 3, and typically passes through a slot or break in the particle filter 19. From a distance of approximately two inches below the particulate filter 19 and to the top of the container, the separator plate 27 is sold and blocks the passage of water within this section of the container.

Figure 4:
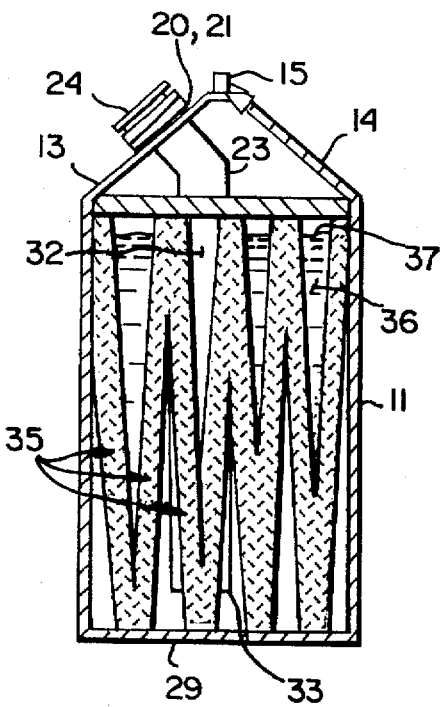
FIG. 4 is an view, partly in cross-section and partly in elevation, of another embodiment of carton according to the invention.

FIG. 4 illustrates an embodiment similar to that of FIG. 2 only the fill tube is much longer, in addition to the top portion 23 thereof having an elongated bottom portion 32 which terminates—as illustrated at 33—in an open end just above the bottom 29 of the carton 11. In FIG. 4 structures comparable to those in FIGS. 1-3 are shown by the same reference numerals. In this embodiment instead of the low density activated carbon media substantially filling the interior of the carton 11, the media is in sheet form and is accordion pleated, as illustrated by arrows 35 in FIG. 4. Also in FIG. 4 the drinking water which substantially fills the carton 11 can be seen as generally indicated by reference numeral 36, having a top surface 37. This design economizes the use of the low density media with slight facilitating of the fill and pour function.

Figure 5:
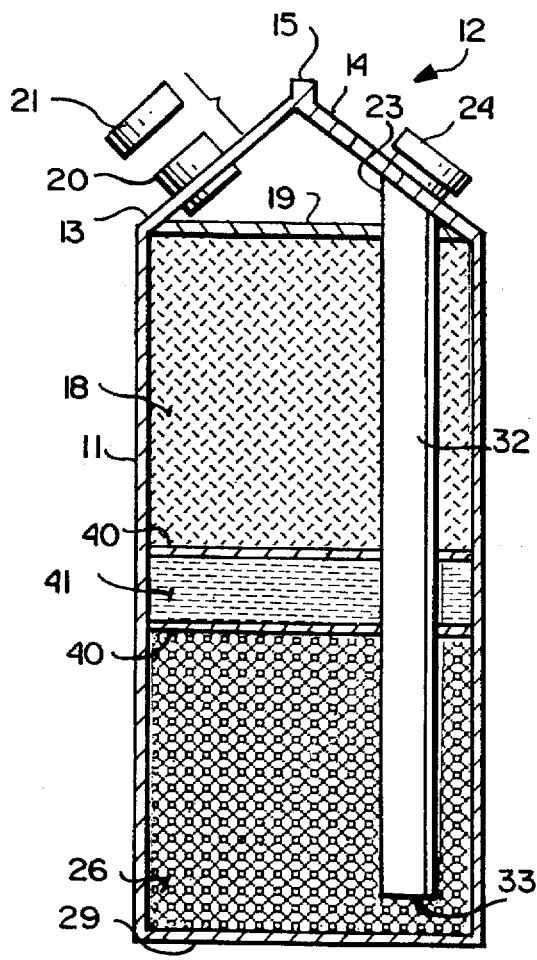
FIG. 5 is a view like that of FIG. 4 for yet another embodiment of carton according to the invention.

FIG. 5 illustrates another embodiment (again comparable components being shown by the same reference numerals) which is a modification of the FIGS. 3 and 4 embodiments. In this embodiment the fill tube 23, 32 is disposed in the angled side 14 of the gable top 12, opposite the side 13 containing the pour opening 20, and in this embodiment the biocidal media 26 is supported by the bottom 29 of the carton 11, the open end 33 of the tube 32 opening into the media 26. The media 18 is above the media 26, and in this particular embodiment is separated not merely by porous media separating plates 40, but also by low density ion exchange media 41 between the plates 40.

Figure 6:
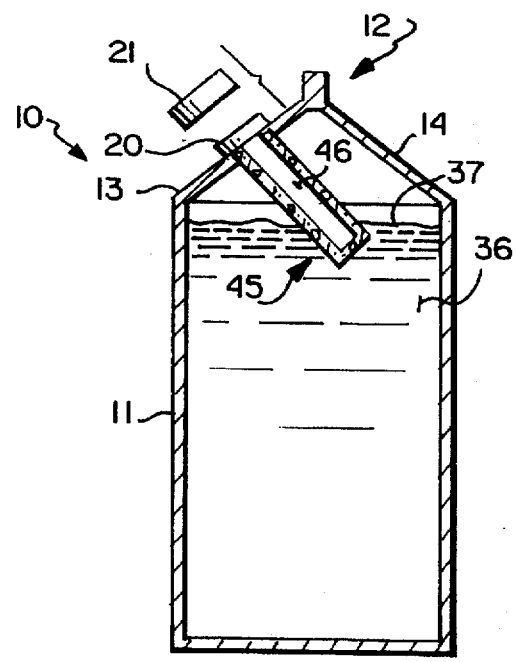
FIG. 6 is a view like that of FIG. 5 for another embodiment of carton according to the invention.

In the FIG. 6 embodiment (again comparable structures being shown by the same reference numeral) the activated carbon-containing mass is fixedly mounted in the carton 11 so that the water 36 substantially only comes into significant contact with the mass when water is being, or about to be, poured through the pour opening 20. In this case this is done by providing a closed end hollow tube—shown generally by reference numeral 45—of activated carbon material which has sufficient porosity so that when the carton 11 is tipped toward the face 13 side thereof water passes through the tube 45 into the hollow interior 46 thereof, and then passes through the opening 20 (when cap 21 is removed).

Figure 7:
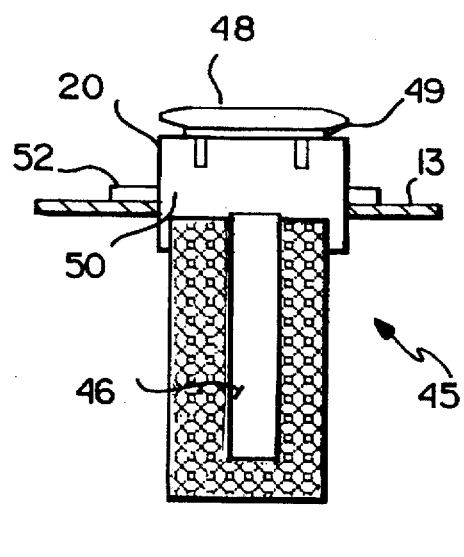
FIGS. 7 through 10 are side views of different types of pour openings/spouts that may be provided for use in the embodiment of FIG. 6.

The exact construction of the tube 45 may be varied, and indeed a number of different forms are illustrated in FIGS. 7 through 10. The embodiment of FIG. 7 is the same as that of FIG. 6 only instead of a detachable cap 20, the opening 20 has a permanent non-removable gravity pour safety spout, including the top 48 with a seal 49 at the bottom thereof sealing with openings (not shown) in the top of the plastic cap 50 defining the pour opening 20 with a shaft 51 (see FIG. 14 which shows the cap per se in an open position) guiding the top 48 for reciprocal movement from the sealing (FIG. 7) to the non-sealing (FIG. 14) positions. A seating flange 52 may also be provided abutting the fiberboard/cardboard surface 13 in which the opening 20 and tube 45 are attached.

Figure 8:
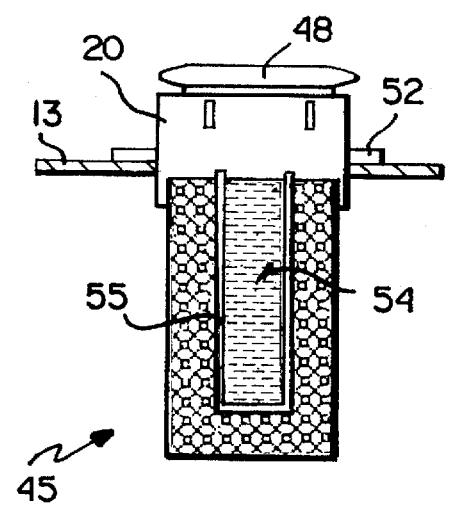

In the embodiment of FIG. 8, structure the same as that as seen in FIG. 7 is provided only instead of the hollow interior 46 a biocidal filter element 54 is provided, with a one end closed tube media separator 55 between the activated carbon tube 45 and the biocidal filter element 54. Alternatively, the material 54 may be the activated carbon material and the tube 45 the biocidal filter element.

Figure 9:
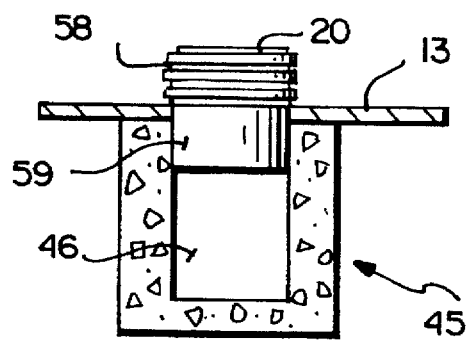

FIG. 9 illustrates an embodiment in which the opening 20 is formed by a threaded exterior closure spout 58. The activated carbon hollow (see hollow interior 46) filter tube 45 is affixed to the bottom portion 59 of the threaded closure spout 58.

Figure 10:
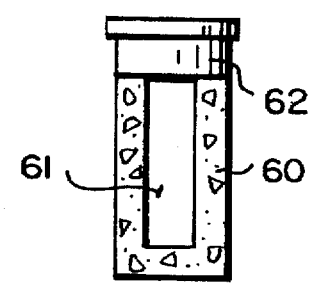

FIG. 10 illustrates an insert which may be provided in the structure of FIG. 9. The insert includes another filter element 60, with a void area interior 61, and an end tubular structure 62, which can slide into the structure 58, 45, 46 of FIG. 9. The filter 60 may be of any suitable material, either merely a particle filter, a biocidal filter element, or the like.

Figure 11:
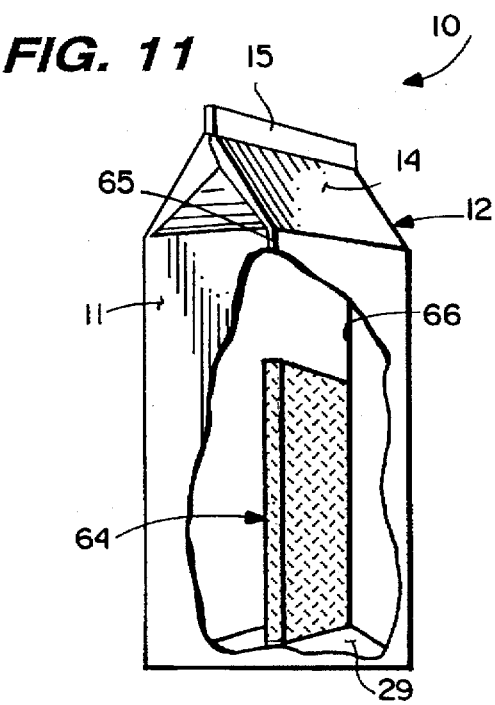
FIG. 11 is a perspective side view, with a portion of the carton cut away for clarity of illustration, of another embodiment of the carton according to the present invention.

FIG. 11 illustrates another embodiment of a container 10 according to the invention, again the same structures as shown in the other embodiments being shown by the same reference numerals. In this embodiment the activated carbon mass is in the form of filter media encased in a particle filter bag 64 which is set diagonally in the carton 11, extending between the diagonal edges 65, 66 thereof and held in place by a friction fit, or by bonding an edge segment to the housing.

Figure 12:
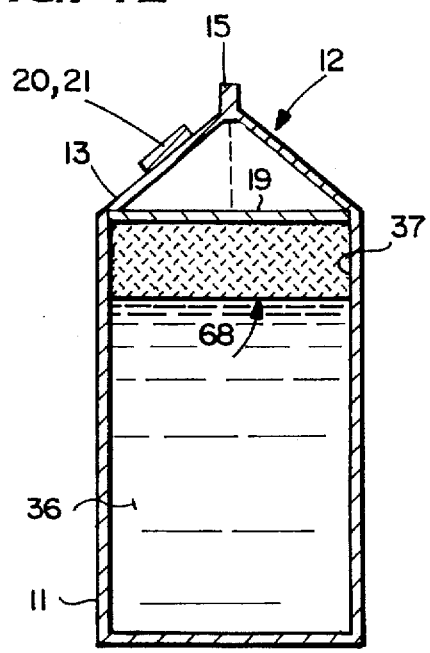
FIGS. 12 and 13 are views like that of FIG. 4 for yet other embodiments of cartons according to the present invention.
Figure 13:
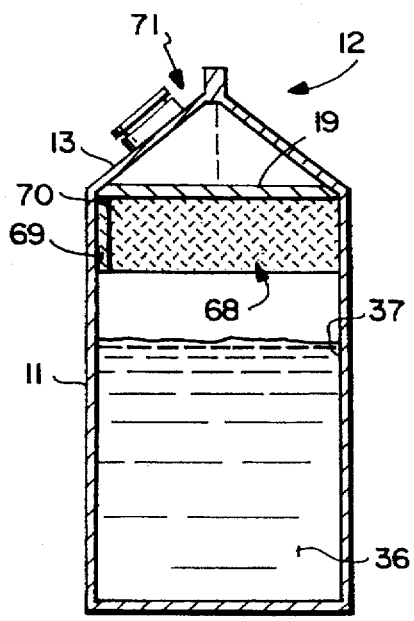

In the embodiment of FIG. 12, the activated carbon mass is in the form of activated carbon filter media contained within a particle filter bag, shown generally by reference numeral 68. The bag 68 is not wedged in place—as is the bag 64 in FIG. 11—but rather is free to float in the carton 11 on or near the surface 37 of the water 36 therein. The embodiment of FIG. 13 is essentially identical to that of FIG. 12 only the bag 68 is not merely free to float, but is of a heat sealable material, and is heat sealed to the carton 11 or to a particle filter 19. In FIG. 13 one heat seal—to the top interior side portion of the carton 11—is shown schematically by reference numeral 69 while another heat seal—in this case to the filter 19—is shown schematically by reference numeral 70. The seals 69, 70 are just sturdy and extensive enough so as to hold the activated carbon element 68 in the position illustrated in FIG. 13 even though the water level 37 of the water 36 therein may not be adjacent the gable top 12.

Also in the FIG. 13 embodiment the pour opening—shown generally by reference numeral 71—has the configuration illustrated in FIG. 14, which again shows a conventional gravity pour top that is not removable and is like that illustrated in FIG. 7 only without the filter tube 45 associated therewith, and shown in FIG. 14 in the open position (whereas it is in closed position in FIG. 7).

Figure 14:
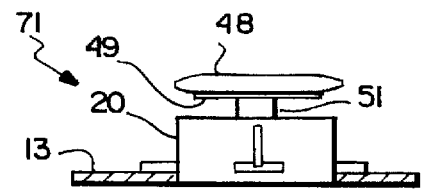
FIGS. 14 and 15 are side views of different types of pour openings that may be provided in the cartons of any of the other FIGURES.
Figure 15:
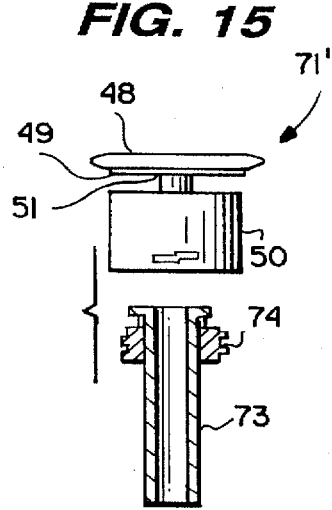

FIG. 15 illustrates another embodiment of the permanent non-removable gravity pour spout 71 of FIG. 14. The structure 71' illustrated in FIG. 15 is like the structure 71 (and includes comparable reference numerals) only in this case fluid ports therein are near the periphery of the body 50 at the top thereof, and located interior thereof is an offset fill tube 73 which cooperates—utilizing a threaded container section 74—with an interior screw thread (not shown) in the cap 50 concentric with the shaft 51. This allows liquid to exit the container with which the structure 71' is associated through the circumferential pour openings, and to be filled by introducing the liquid (e.g. through a flexible tube) to the interior fill tube 73.

If desired, the tube 45 (such as illustrated in FIGS. 6, 7, and 9) may be an extruded or die molded activated carbon cylinder having a porosity of 10–120 microns. Tube 45 may be produced using about 5–60% binder (such as 75–135 mesh plastic resin granules) and about 95–30% powdered or granular activated carbon of 80–325 mesh. Other materials (e.g. zeolytes, insert materials, etc.) may also be included. The tubes 45 are subjected to sufficient heat and pressure or vacuum in a suitable mold or tool to permit the resins to become semi-fluid and produce a bond of the activated carbon so that they form the tube configuration 45.

Figure 16:
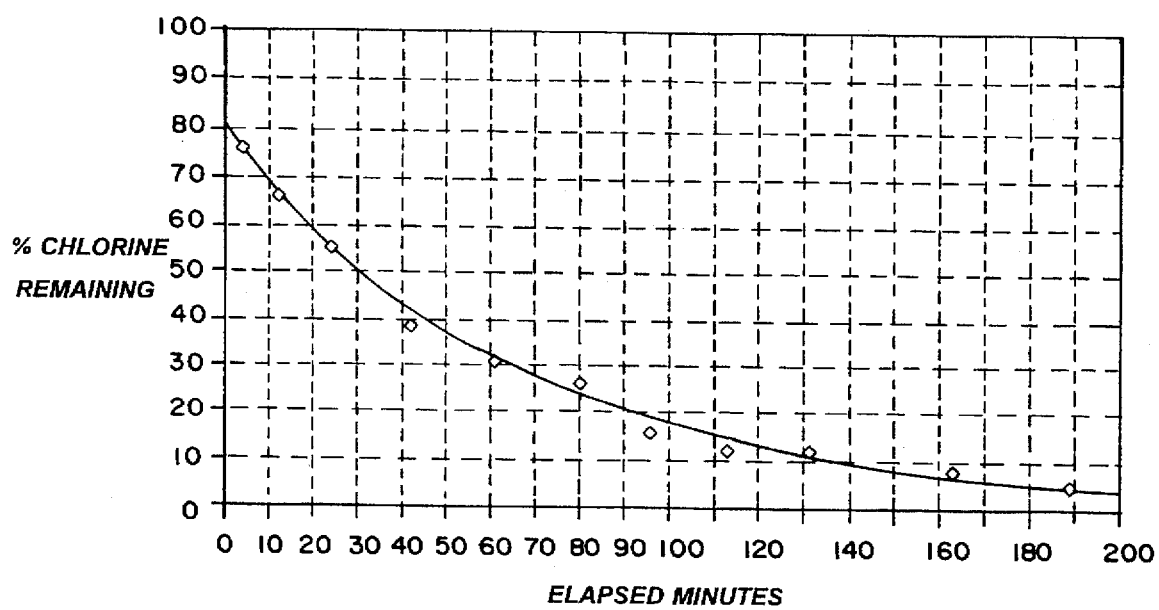
FIGS. 16 through 18 are graphical representations of various abilities of carton assemblies according to the present invention to remove contaminants.
Figure 17:
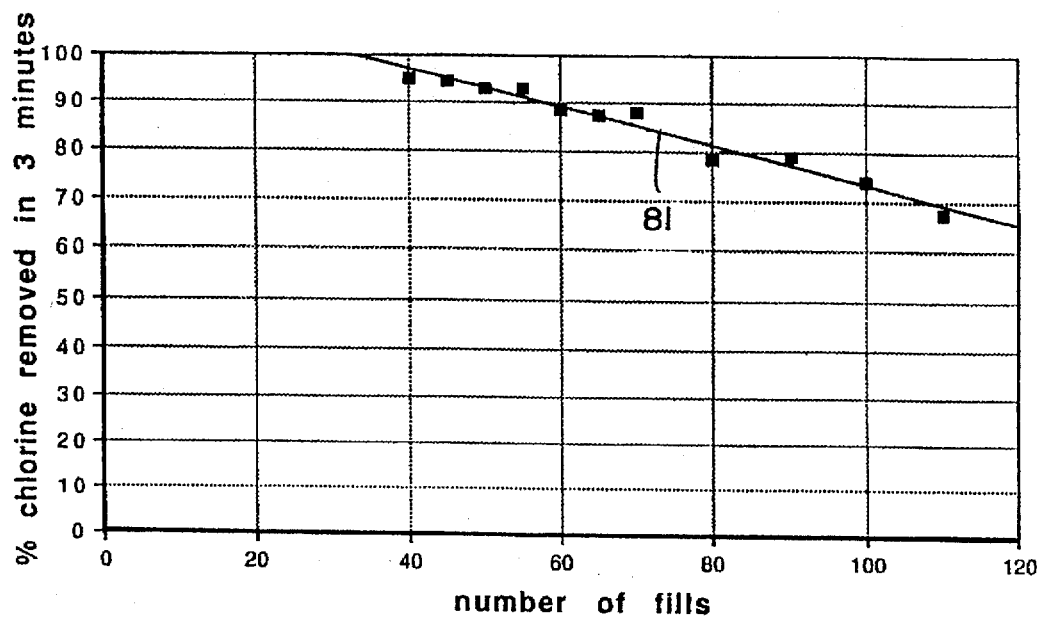
Figure 18:
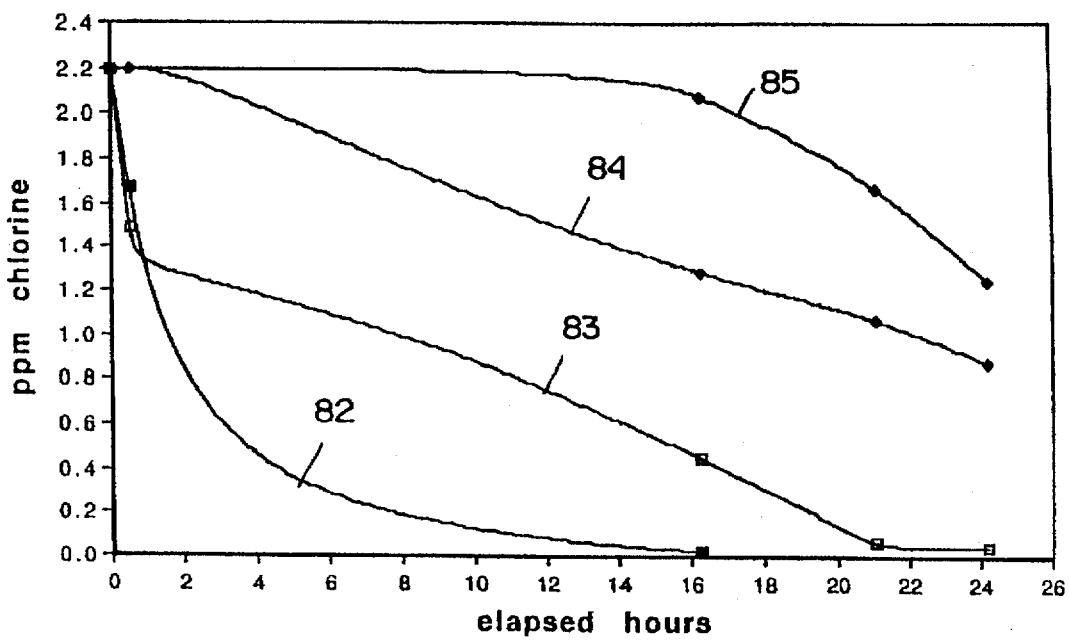

Regardless of what the exact configuration of activated carbon media in any of the above embodiments is, it is suitable for removing more than 90% of the chlorine or other taste and odor undesirable components from the water (36) in the carton 11. FIGS. 16 through 18 graphically illustrate this capability.

In the FIG. 16 embodiment a low density mat configuration of activated carbon (such as in European published application 0402661) having a surface area of about 0.286 square feet was placed in a one-half gallon conventional milk carton (11). The original level of chlorine in the drinking water in the carton (11) was 2.74 ppm. The low density mat had dimensions of 5.5 inches by 7.5 inches, and the water within the carton (11) was at about 25° C. FIG. 16 shows the percentage of chlorine remaining on the Y axis and lapsed minutes on the X axis. Thus it took about 140 minutes (under these conditions), to remove 90% of the chlorine. This is illustrated by graph line 80 in FIG. 16.

While a size of 2.33 square feet of carbon-containing material is considered almost optimum for a one-half gallon carton. Between about 1.25–2.75 square feet of low density per half gallon capacity, the cartons are considered practical when the activated carbon is in a web or accordian type configuration (in the actual tests done in FIG. 17 the web had the accordion fold configuration illustrated generally at 35 in FIG. 4) only with the folds touching to essentially fill the container. However under some circumstances even smaller square footage components can be used. This is especially so if the carton is not refillable, and there is sufficient shipping time from the "bottling" (packaging) location to the retail display place. For example using a single sheet of low density activated carbon mat having dimensions of 5.5×7.5 inches (e.g. 0.29 square feet) placed diagonally inside the carton 11, as illustrated in FIG. 11, within about 140 minutes 90% of the chlorine was removed from the water at 25° C. (see FIG. 16). In another test done using a low density activated carbon mat having dimensions of 3.75 inches×3.75 inches (0.1 square feet) held flat against the inside surface of the carton, and at 3° C. (refrigerated conditions), it took about six days to remove 90% of the chlorine.

In the embodiments, such as in FIGS. 6 and 7, in which the water does not touch the activated carbon until poured, the chlorine in the water continues to act inside the carton 11 to retard the growth of bacteria, etc., and the majority is not removed until just before being poured out.

A test similar to that illustrated in FIG. 16 was done for a refillable carton (cartons according to the present invention may be designed for one time use or to be refilled). In this particular configuration again the activated carbon was in the accordion form illustrated in FIG. 4 and had an area of 2.33 square feet. The carton 11 was filled with water spiked with chlorine to between 2–3 ppm (near or slightly higher than typical tap water). After three minutes it was poured out and chlorine was added to the water before it was poured back in. At intervals the ppm free chlorine was measured in the influent and effluent water and a percentage reduction was calculated. This is plotted in FIG. 17 by graph line 81, in which the percentage of chlorine removed in three minutes is plotted along the Y axis and the number of fills along the X axis. It will be seen from FIG. 17 that 90% of the chlorine was removed in three minutes out to about 60 fills, and 60% out to 120 fills. Performance would have been improved if measurements were taken after longer time periods (such as five or ten minutes instead of three minutes).

FIG. 18 illustrates a test comparing the removal at different temperatures. In the test illustrated in FIG. 18 the configuration of the mat 64 of FIG. 11 was utilized, having a surface area of about 0.143 square feet (3.75 inches×5.5 inches). One test and one control carton (containing no activated carbon media) were refrigerated (3° C.) and another set of test and control cartons was left out at ambient temperature (about 25° C.). The results are seen in FIG. 18, where graph line 82 shows the 25° C. test carton, line 83 the 3° C. test carton, line 84 the 25° C. control carton, and line 85 the 3° C. control carton.

It will thus be seen that according to the present invention a highly advantageous manner of packaging drinking water for sale is provided, which is ideally suited for the use of cardboard or fiberboard gable top cartons which can also be used as a high performance water filter. While the invention has been herein shown and described in what is presently conceived to be the most practical and preferred embodiment it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A container comprising: water containing chlorine, lead, taste and odor contaminants; a gable top fiberboard or cardboard carton having a top and bottom and containing the water; at least one opening for dispensing water from said carton; and an activated carbon-containing integral mass of material, capable of removing more than 90% of the chlorine and lead as well as the taste and odor contaminants from water dispensed from said carton by contacting the water, said activated carbon-containing integral mass of material positioned within said carton so that the water within said carton comes into contact with said mass of material prior to reaching said opening for dispensing water.

2. A container as recited in claim 1 wherein said carton top has said opening formed therein, said opening comprising a pour opening, and wherein said activated carbon-containing mass is fixedly mounted in said carton so that the water in said carton substantially only comes into significant contact with said mass just before or when the water is being poured through said pour opening.

3. A container as recited in claim 2 wherein said carbon-containing mass comprises a hollow-tube surrounding said pour opening and extending into said carton from said pour opening, said hollow tube comprising about 5–60% binder of about 75–135 mesh plastic resin granules, and about 95–30% powdered or granular activated carbon of about 80–325 mesh, bonded together, and having a porosity of about 10–230 microns.

4. A container as recited in claim 1 wherein said mass of material is in sheet form and is mounted within said carton adjacent the bottom thereof.

5. A container as recited in claim 1 wherein said mass of material floats at or near the surface of the water in said carton.

6. A container as recited in claim 1 further comprising biocidal media mounted within said carton and separated from said activated carbon-containing mass.

7. A container as recited in claim 6 wherein said biocidal media and carbon-containing mass are separated within said carton by an ion exchange media.

8. A container as recited in claim 6 wherein said opening comprises a pour opening in said top of said carton; and further comprising a fill port in said top, and a hollow fill tube extending from said fill port to just above said bottom of said carton, said biocidal media and integral mass of material disposed exteriorly of said fill tube.

9. A container as recited in claim 8 wherein said carbon-containing mass is adjacent said top of said carton and said biocidal media is supported by said bottom of said carton, said fill tube extending into said biocide media.

10. A container as recited in claim 1 further comprising a pour opening in said top of said carton, a fill port in said top, and a hollow fill tube extending from said fill port to just above said bottom of said carton.

11. A container as recited in claim 1 wherein said mass includes a containing element of material capable of being heat bonded to said fiberboard or cardboard carton, and further comprising a heat bond between said containing element and carton holding said mass in place in said carton.

12. A container as recited in claim 1 wherein said carbon-containing mass is an accordion-pleated sheet material.

13. A container as recited in claim 1 wherein said opening comprises a pour opening in said top of said carton, and further comprising a fill opening in said carton top; and wherein both said fill and pour openings are capped by readily removable and replaceable caps.

14. A container as recited in claim 1 further comprising a fill opening in said top of said carton and a hollow fill tube extending from said fill opening into said carton terminating adjacent said carton bottom.

15. A container as recited in claim 1 wherein said container is sealed and substantially filled with drinking water.

16. A container as recited in claim 1 wherein said mass is in a porous bag or shell.

17. A container comprising a top portion with a pour opening therein, and extending inwardly into the container from the pour opening a filter tube, said filter tube comprising about 5–60% binder of 75–135 mesh plastic resin granules, and about 95–30% powdered or granular activated carbon of about 80–325 mesh, bonded together, and having a porosity of 10–120 microns.

18. A container comprising:

a sealed gable top fiberboard or cardboard carton having a top and a bottom and having a low density web of activated carbon-containing material disposed within said carton, said web having a surface area of between about 1.25–2.75 sq. feet per half gallon capacity of said carton, said container substantially filled with drinking water.

19. A container as recited in claim 18 further comprising separate and distinct fill and pour openings in said top of said carton.

20. A container comprising:

a gable top fiberboard or cardboard carton having a top and a bottom;

an opening in said carton;

an activated carbon-containing integral media;

a biocide-containing media;

both said carbon and biocide-containing media mounted within said carton; and separating means disposed within said carton separating said carbon-containing media from said biocide-containing media.

21. A container as recited in claim 20 further comprising first and second openings disposed in said carton top, said first opening in direct communication only with said carbon-containing media and said second opening in direct communication only with said biocide-containing media.

22. A container as recited in claim 21 wherein said carbon-containing and biocide-containing media are mounted side-by-side in said carton, and wherein said separating means comprises at least one of a porous media separator plate, and ion exchange media.

* * * * *